J. J. SCHERMACK.
STAMP VENDING MACHINE.
APPLICATION FILED JAN. 7, 1916.
1,250,517.
Patented Dec. 18, 1917.
5 SHEETS—SHEET 1.
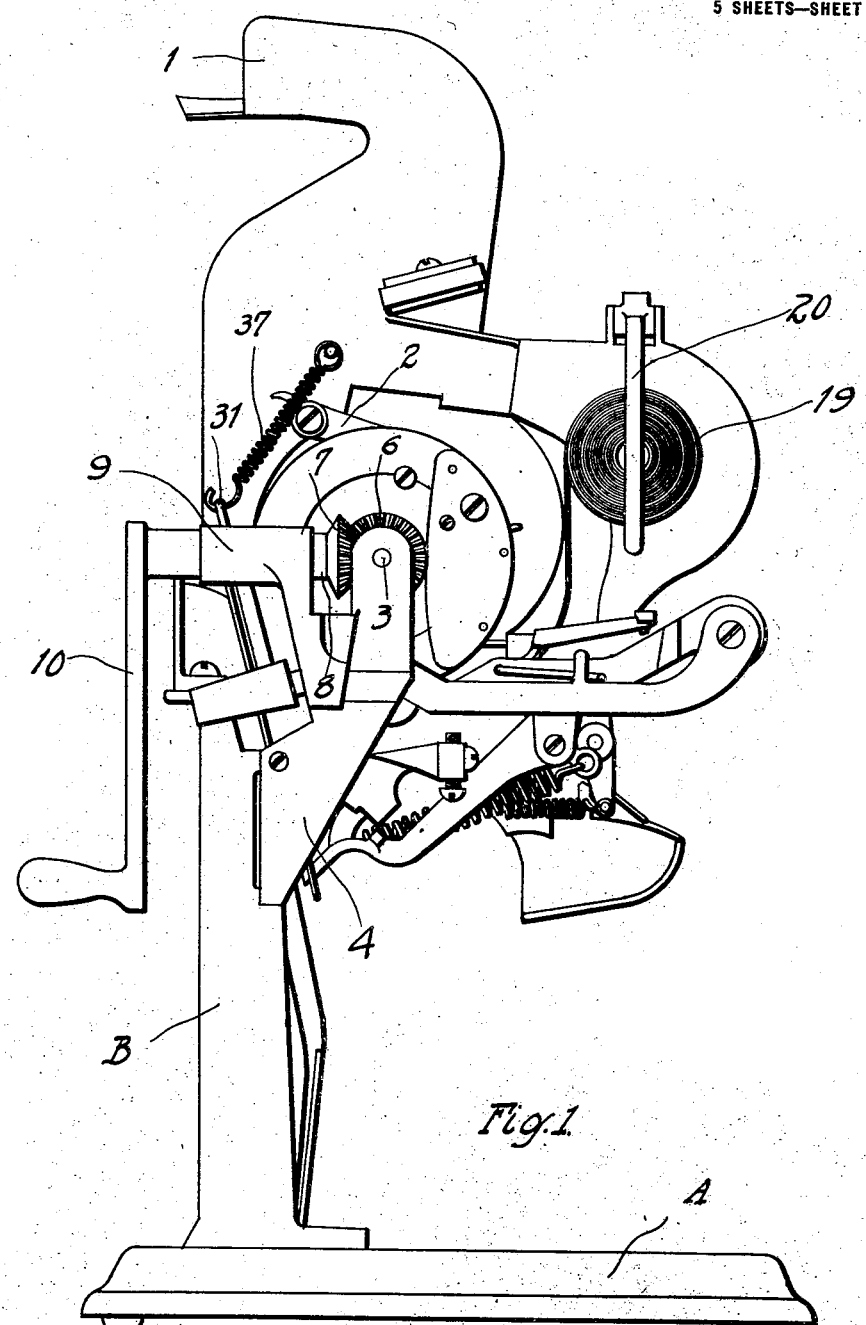
Fig. 1
WITNESSES.
INVENTOR
Joseph J. Schermack,
BY 
Attorneys.

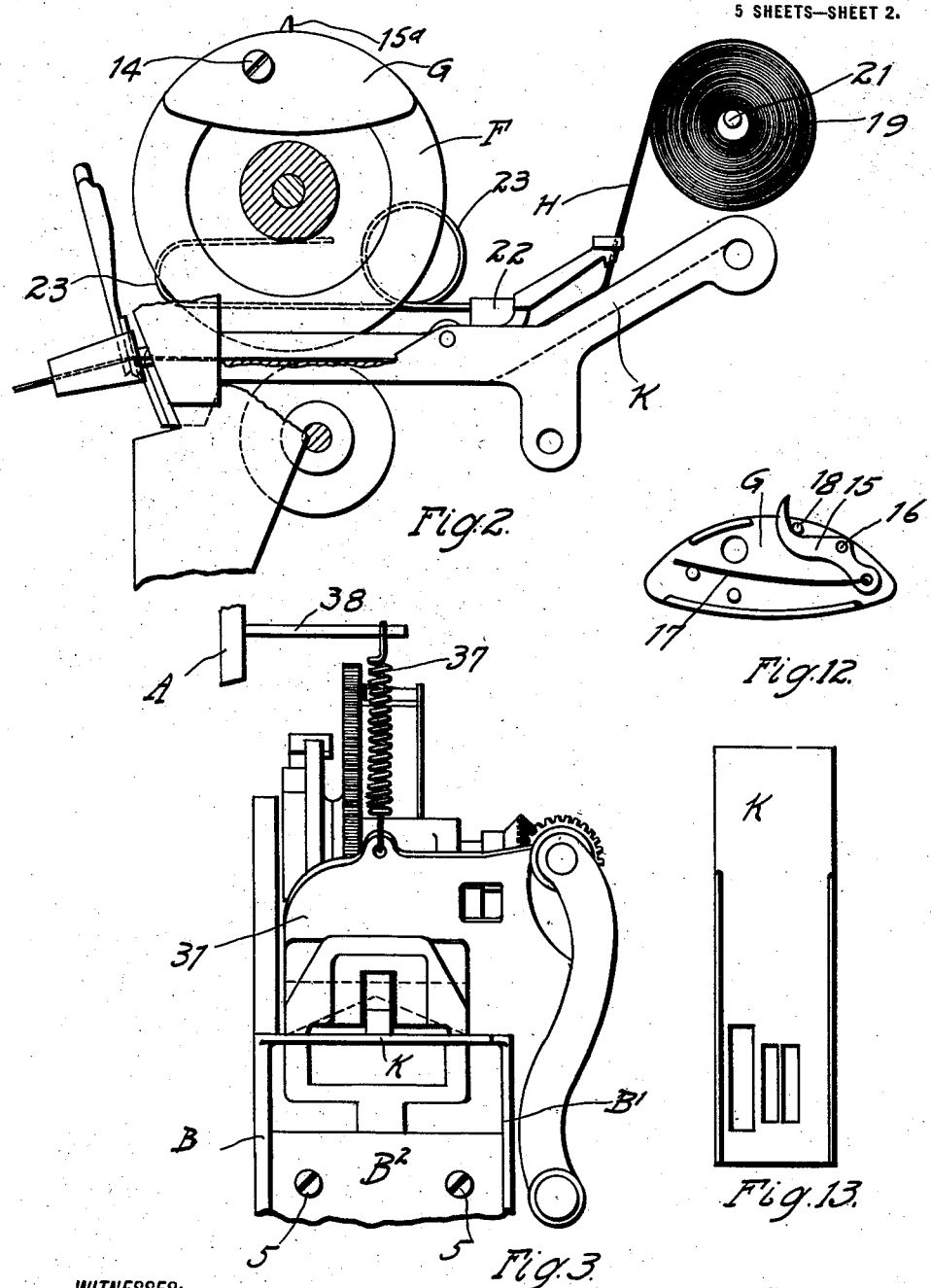

J. J. SCHERMACK.
STAMP VENDING MACHINE.
APPLICATION FILED JAN. 7, 1916.
1,250,517.
Patented Dec. 18, 1917.
5 SHEETS—SHEET 3.
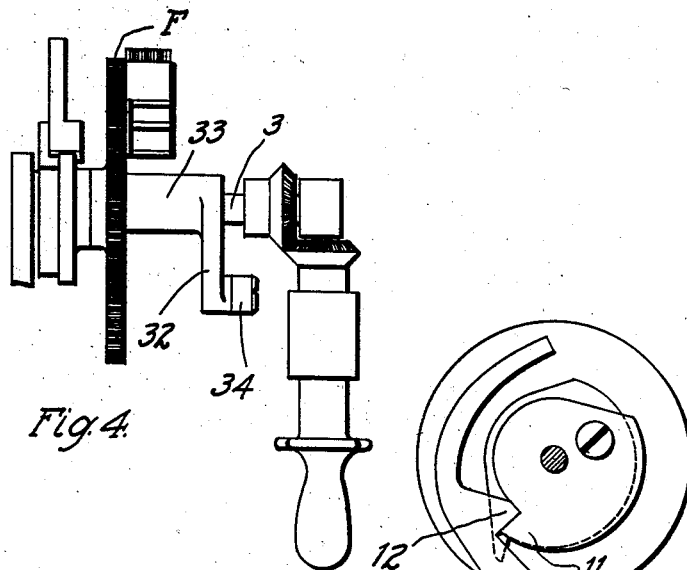
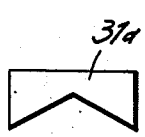
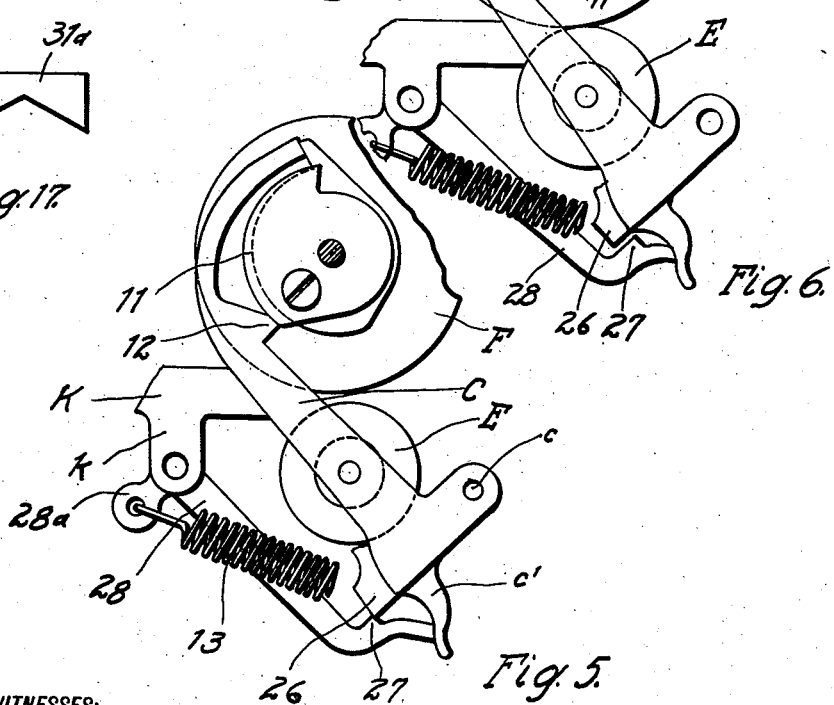
WITNESSES:
Paul G. R. Kresing, jr.
Chas. W. Stauffiger
INVENTOR
Joseph J. Schermack.
BY
ATTORNEYS

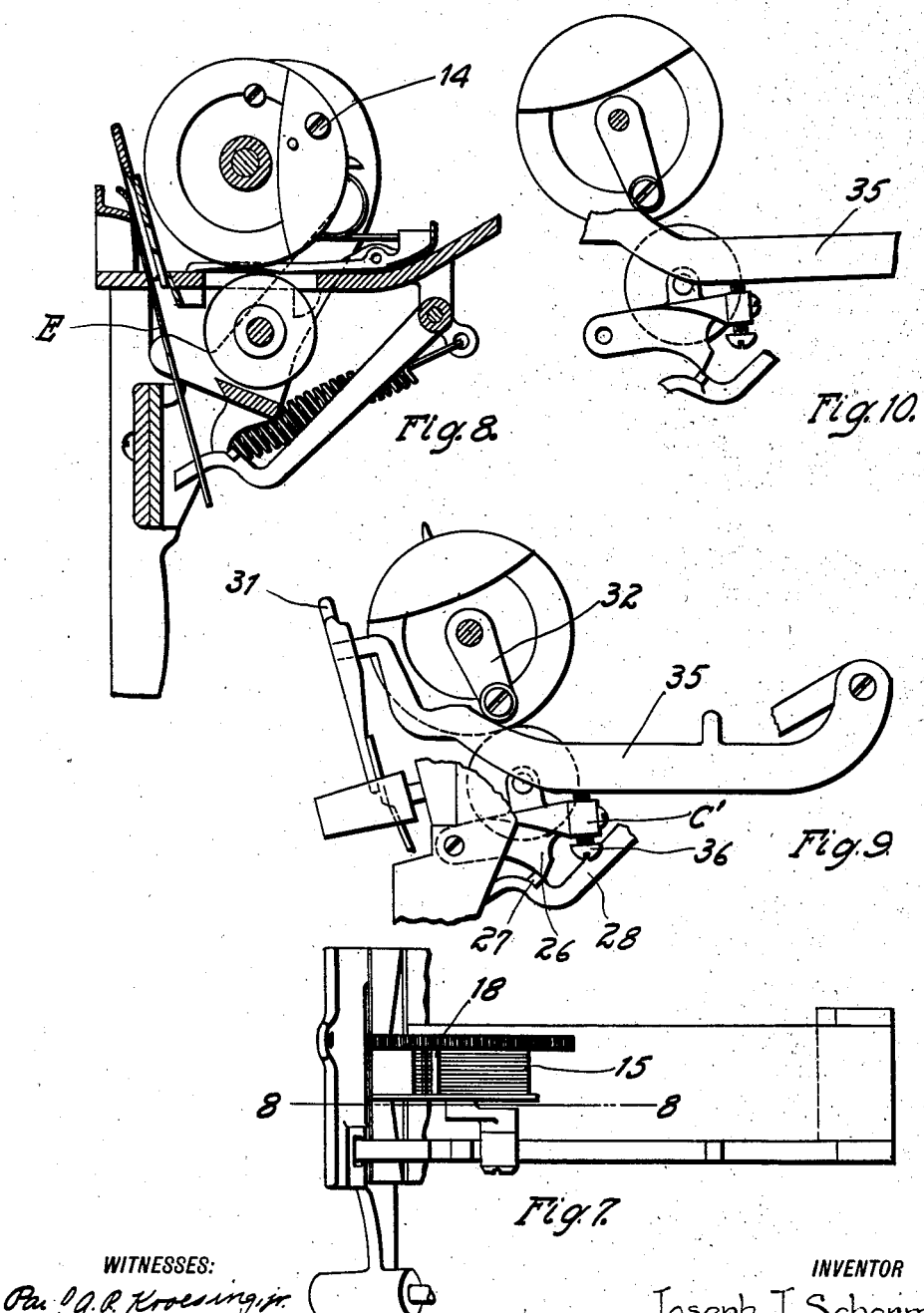

J. J. SCHERMACK.
STAMP VENDING MACHINE.
APPLICATION FILED JAN. 7, 1916.

1,250,517.

Patented Dec. 18, 1917.
5 SHEETS—SHEET 5.

WITNESSES:
Paul A. R. Kroesing, jr.
Chas. W. Stauffiger

INVENTOR
Joseph J. Schermack,
BY
ATTORNEYS

UNITED STATES PATENT OFFICE.

JOSEPH J. SCHERMACK, OF DETROIT, MICHIGAN, ASSIGNOR TO THE SCHERMACK CO., OF DETROIT, MICHIGAN, A CORPORATION OF MICHIGAN.

STAMP-VENDING MACHINE.

1,250,517.      Specification of Letters Patent.      Patented Dec. 18, 1917.

Application filed January 7, 1916. Serial No. 70,740.

*To all whom it may concern:*

Be it known that I, JOSEPH J. SCHERMACK, a citizen of the United States of America, residing at Detroit, in the county of Wayne and State of Michigan, have invented certain new and useful Improvements in Stamp-Vending Machines, of which the following is a specification, reference being had therein to the accompanying drawings.

This invention relates to stamp vending machines and has for its object a vending machine which combines with one of the feed rolls, a device for alining the perforations between the stamps with the severing means. Provision is made to allow the strip of stamps to buckle slightly so as to allow keeping of the feeding rolls together until after the severing blade has started to cut the strip. This is done in order to prevent any possible extraction of the strip from the machine by unauthorized means. The apparatus is also so arranged that a shutter operates in conjunction with the feeding means, so that when the strips begin to feed, the shutter moves away from the path of the stamps and before the feeding is quite completed, the shutter moves back into position, resting on the strip of stamps until the severed ones have been drawn out, when it drops down so as to successfully prevent any attempt to catch hold of the stamp strip and draw it through the mouth of the stamp track.

Stamps which are purchased from the government are not always uniform in the spacing of perforations, so that some means for assuring that the severing blade will sever at the line of perforations, is required. This means I have devised in the form of a plurality of fingers that are carried by the upper feed roll. The operating arms for the shutter are so arranged that when it is closed, it is automatically locked, so that it cannot be raised by one tampering with the machine.

In the drawings:—

Figure 1, is a side elevation of the assembled machine, the cabinet being removed.

Fig. 2, is an elevation of the feeding rolls, the members, in Fig. 1, that intervene in front of the feeding rolls, being omitted.

Fig. 3, is an elevation showing the mouth of the stamp track, the severing blade and the driving connections.

Fig. 4, is a top elevation of the driving connections, the operating shaft, the cam members and the feed roll on such shaft.

Fig. 5, is an elevation of the rock frame that carries the lower feed roll, showing the feed rolls separated. This figure, also, shows the shutter arm automatically locked with respect to part of the rock frame, so that the shutter cannot be raised. This view is taken from the reverse side of the assembled machine, as shown in Fig. 1.

Fig. 6, is a detail elevation of the same parts, showing the rock frame directly after it has brought the lower feed roll in contact with the upper feed roll, by reason of the cam following projection dropping over the abrupt shoulder of the cam. The shutter arm has been drawn out of contact with the part of the rock frame that locked the shutter and the shutter has been raised by the spring attached to the shutter arm.

Fig. 7 is a top elevation of part of the frame showing the severing blade, the blade arm, its actuating cam and the upper feed roll.

Fig. 8, is an elevation partly in section, taken along the line 8—8 of Fig. 7. This figure shows the connection between the shutter and the shutter arm.

Fig. 9, is an elevation of parts shown in Fig. 1, the driving connections and their supporting brackets being removed. This figure shows the blade arm cam about to drive the blade arm down so as to give the blade a severing stroke across the stamp strip and it also shows the part of the rock frame that locks the shutter arm.

Fig. 10, is an elevation of the parts shown in Fig. 9, the rock frame being driven down and the rolls separated.

Figure 11:
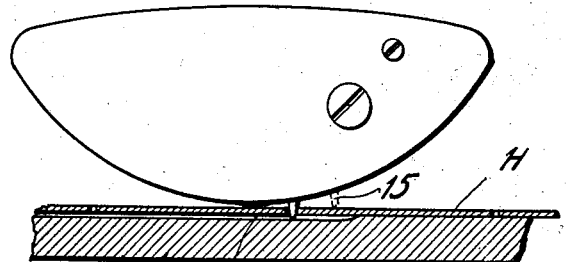

Fig. 11, is a detail of the device for alining the perforations.

Fig. 12, is a detail of this same device with part of the casing removed.

Fig. 13, is a detail of the presser plate.

Figure 14:
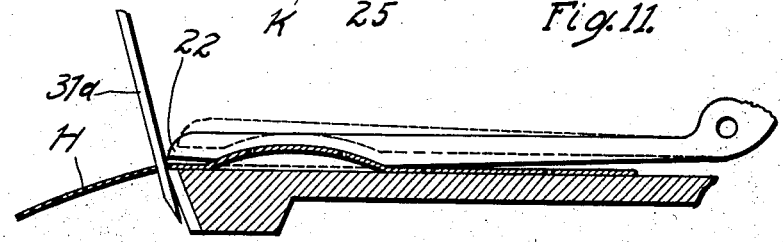

Fig. 14, shows the buckling of the stamp strip under the feeding of the rolls, which are not separated until after the blade has descended, as shown in this figure.

Figure 15:
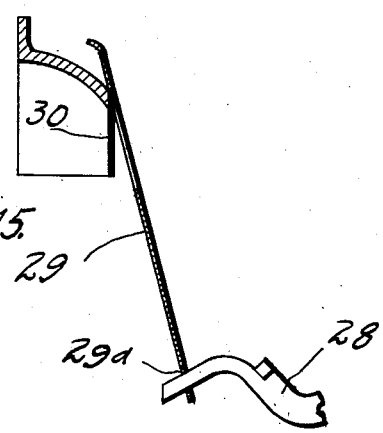

Fig. 15, is a detail of the closed shutter.

Figure 16:
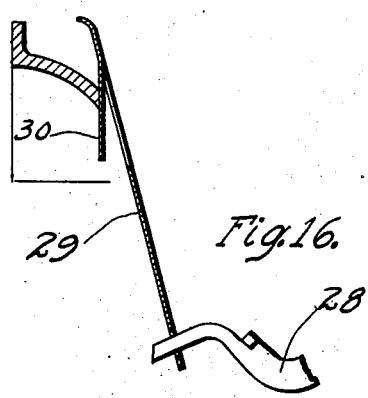

Fig. 16, is a detail of the shutter open.

Fig. 17, is a detail of the severing blade.

A, is the frame upon which is supported the vending apparatus. This frame and apparatus is inclosed in a cabinet, preferably, a glass cabinet. The coin is inserted at 1, and serves to lift the stop lever 2, that holds the main shaft 3, from revolving more than once. The details of this coin controlling apparatus are not illustrated nor described, inasmuch as devices for this purpose are well known in the art, and the controlling device, employed by us is an independent matter of invention. It will suffice for the purposes of my disclosure of the vending apparatus to state, that there is employed in connection therewith, a coin controlling apparatus adapted to stop the rotation of the shaft at given points. The bracket 4, (Fig. 1) is screwed to the uprights B and B' of the frame A, by means of the screws 5 (Fig. 3) that engage through the cross brace B², that connects the uprights B and B'. The bracket 4 supports the shaft 3, upon which is fast the miter gear 6, that meshes with the miter gear 7 of the crank shaft 8. The crank shaft 8 is supported rotatably in the bearing 9, that is part of the same casting or bracket 4, and is actuated by the hand crank 10.

The turning of the hand crank 10, thereby, turns the main shaft 3, it being assumed that the shaft has been released by a proper coin. Referring to Figs. 4, 5, and 6, and especially Fig. 5, it will be seen that the cam 11, is in engagement with the cam following projection 12, on the rock frame C, which is pivoted at c, and drawn into contact with the cam 11, by the spiral spring 13. The frame C, carries the under feed roll E, which, by reason of the cam following projection 12, riding on the top of the cam 11, is held apart from the knurled upper feed roll F. This is the normally inactive position of the rolls (Fig. 5).

The upper feed roll F, carries an alining device G. This comprises a casing screwed to the roller by the screw 14. The interior of the alining member is shown in Fig. 12. A plurality of fingers 15 (Fig. 7) are pivoted to the casing by the stud 16 (Fig. 11). A spring 17 is attached to the inside arm of each finger 15, and normally holds the finger against the stop pin 18. The ends of the fingers protrude from the casing G, as shown at 15ª, (Fig. 2) and the spring controlled pivoting makes these fingers yielding. The stamp strip H, is fed from a storage roll 19, journaled to part of the frame A, and removably held in place by the bent arm 20 (Fig. 1) that engages by gravity against the stud 21, upon which the storage roll is carried. The strip H, is drawn along the stamp track K, that is part of the frame A. The presser plate 22 (Fig. 2) is pivoted to the track portion K, of the frame and yieldingly held against the stamp strip by action of the spring 23. The upper roll engages through the presser plate that is open at its center, (Fig. 13). The presser plate may be lifted (Fig. 14) against the spring tension by placing the finger on the key 24, so that the stamp strip may be initially inserted.

Assuming that the shaft 3 is being revolved by turning the hand crank 10, as the fingers 15 come adjacent the stamp strip, (Fig. 10) they yieldingly drag along the strip for a considerable distance, so that the perforations may be at varied points with respect to the feed roll F. However, as soon as the fingers 15, encounter the perforations in the strip, they will drop in and may project clear through the strip, by reason of the depression 25, in the stamp track K, (Fig. 11). This picking up of the stamp strip occurs before the feed rolls have been brought into feeding operation, for as yet, the under feed roll has not been brought in contact. However, when the upper roll has been rotated a sufficient distance to insure the fingers picking up the stamp strip wherever the perforations may lie, the under feed roll E, is brought into contact with the stamp strip and presses it (Fig. 2) firmly against the upper knurled feed roll F. This is effected by the cam following projection 12 (Fig. 6) abruptly dropping off from the top of the cam 11.

The projection of the stamps is now about to begin, but it is first required that the shutter be removed. This is effected by the last mentioned cam action and the abutment 26 on the rocker frame C, thus, in Fig. 5, the shoulder 27 of the spring controlled and pivoted shutter arm 28 is yieldingly held against and movement of the shutter arm upward to open the shutter is prevented by engagement with the abutment 26 of the rock frame C. However, as soon as the cam 11 allows the cam following projection 12, to drop off from its top, the abutment 26 is removed from the path of the shoulder 27, and the yieldingly controlled shutter arm can pass by the abutment 26 (Fig. 6). The shutter arm 28 is pivoted to the hanger k, of the track portion K, of the frame. The spring 13, that controls the rocker frame C, by being fastened to the depending arm c', is attached at its other end to the bell crank arm 28ª of the shutter 28. This spring 13 causes the shutter arm 28 to move upward when the abutment 26 moves out of the way of the shoulder 27. The shutter arm being attached at its front end to the shutter 29, (Figs. 15 and 16), it causes that part to raise when it is raised and it moves the shutter bar 30 (Fig. 16) from the mouth of the stamp track, leaving sufficient space for the stamps to travel underneath.

The continued rotation of the knurled upper feed roll F, drives the stamps a given distance (which is constant) that it is allowed to rotate with the two rollers together. This distance may be varied to accord with the number of stamps desired to be sold, or the number of stamps protected, may be varied by changing the size of the cam.

Just before the rolls are separated by the means, hereinafter described, and while the feeding of the strip is still going on, the severing knife 31 (Figs. 3, 7, 9, and 14) comes down upon the strip and, by reason of the fingers 15 picking up the strip, the knife is sure to descend upon a line of perforations. The knife blade 31ª has an inverted V-shaped cutting edge, (Fig. 17) so that when the knife descends, it strikes the strip simultaneously at both edges and cuts toward the center. This secures a firm grip upon the stamp strip and prevents the strip in any manner being drawn out when the feed rolls let go of it. In Fig. 14, the strip is shown buckling and provision is made for this by a cut-away portion on the presser plate 22.

Referring to Figs. 4, 7, and 9, the means by which the knife 31 is actuated, is shown. This means comprises a crank 32, cast integral with the hub 33 of the upper feed roll F. This crank 32 carries an anti-friction roller 34, and the crank, and roller are adapted to act as a cam and will be called, the second cam, for purposes of reference in the claims. The second cam, during the revolution of the shaft 3, is adapted to strike against the knife arm 35, which is a pivoted member, (Fig. 9) and drive the same down, (Fig. 10) causing the knife blade 31ª to cut through the strip, as shown in Fig. 14. The side extension C', of the rock frame C, extends out under the knife arm 35, as shown in Fig. 9, and the adjusting screw 36 affords an adjustable contact with the knife arm 35. When the knife arm 35 is driven down by the crank arm 32, or the second cam, this also forces down the side extension C', which is part of the rocker frame C, and inasmuch as the rocker frame carries the lower feed roll E, this separates the rollers, causing them to assume their normal inactive position, as shown in Figs. 5 and 9ª. Referring to Fig. 5, it is seen that the high part of the cam 11 has just reached the cam following projection 12 and by rocking the rock frame C, the shoulder 27 slides to the right of the abutment 26, as shown in Fig. 10. This movement of the shutter arm brings the shutter 29 down and drops the shutter bar 30 directly on the stamps which have been severed. When the operator withdraws the severed stamps, the shutter bar drops down still farther, by reason of the loose connection 29ª of the shutter with the shutter arm. This insures a secure obstruction at the mouth of the stamp track. When the second cam, or crank 32, has passed out of contact with the knife arm 35, the knife is returned to its initial position by the spring 37, that is attached to the pin 38, that is fast to the frame A (Fig. 3). The spring 37 has an angular pull upon the severing knife 31, (Fig. 1). This keeps the severing blade in contact with the edge of the stamp track, so as to afford the proper sheering action during cutting.

The vending operation has been now completed and the shaft 3 turns until it is stopped by the lever 2 (this operation not being shown as it is part of the coin controlling apparatus). The vending apparatus is now in position to repeat the operation upon release of the lever 2 by the coin.

What I claim is:—

1. In a stamp vending machine, the combination of a relative stationary roll, a roll movable to and from the stationary roll, means actuated by said stationary roll to shift said movable roll away from said stationary roll, a severing blade, an alining device carried by the stationary roll and adapted to pick up the stamps regardless of the location of the perforations with respect to the rolls and thereby aline the perforations with the severing blade, and means actuated by the stationary roll adapted to operate said blade.

2. In a stamp vending machine, the combination of upper and lower rolls, means controlled by the operation of the upper roll adapted for moving the lower roll to and from the upper roll, a flexible member on the periphery of the upper roll adapted to pick up the stamp strip regardless of the location of the perforations and thereby insuring a uniform feed, and severing means with which said flexible member coöperates, substantially as described.

3. In a stamp vending machine, the combination of a feeding roll, a plurality of yielding fingers projecting from the periphery and adapted to pick up the stamp strip by dragging on the strip dropping through the perforations, and severing means with which said fingers coöperate, substantially as described.

4. In a machine for vending strips of stamps, a guide for stamps, a roll above said guide, a roll below said guide and shiftable in said guide to and from said upper roll, a blade reciprocable through said guide, a shutter reciprocable through said guide, and means controlled by the operation of said upper roll adapted for moving said lower roll, blade and shutter in timed relation so that a strip of stamps are fed in position to be severed by said blades with the shutter closing said guide as the severed strip of stamps is removed.

5. In a stamp vending machine, the combination of guiding means for a strip of stamps, a severing blade, an arm supporting said blade, feed rolls adapted to grip the stamp strip and feed the same until the severing blade has partially cut through the strip, and means carried by one of said feed rolls adapted to impinge on said arm to lower the blade carried thereby.

6. In a stamp vending machine, the combination of a stamp track, provided with a sharp edge, rotary means adapted for intermittently feeding stamps onto said track, a severing knife adapted to reciprocate across the sharp edge of the stamp track, spring actuated means adapted to move said knife in a cutting direction, and adapted to be set for operation by said rotary means, and a spring for returning the said knife and drawing obliquely on said knife for the purpose of keeping said knife in close shearing relation with the sharp edge of the stamp track, substantially as described.

7. In a stamp vending machine, the combination of a main shaft, a feed roll thereon, a spring controlled rock frame, a second feed roll carried by the rock frame, a cam on the main shaft adapted to rock the frame at determined periods and throw the second roll into or out of contact with the first roll and a spring pressed shutter arm controlled by the same cam, substantially as described.

8. In a stamp vending machine, a stamp track, a shutter for guarding the mouth of said track, a rock frame adapted for opening and closing said shutter arm at given periods, and adapted for locking said shutter against unauthorized movement, and rotary stamp feeding means adapted to actuate said rock frame.

9. In a stamp vending machine, a stamp track, a shutter for guarding the mouth of said track, a spring controlled shutter arm having a shoulder and adapted to operate the shutter and a rock frame provided with an abutment, the said abutment of the rock frame being adapted, at a given time, to engage the shoulder of the shutter arm and thereby close the shutter and slide by the shoulder so that the shoulder and abutment are in position to prevent the unauthorized lifting of the shoulder, substantially as described.

10. In a machine for vending strips of stamps, a guide, a roll above said guide, a roll below said guide and shiftable in said guide to and from said upper roll, yieldable means projecting from a portion of the periphery of the upper roll adapted for engaging a strip of stamps and shifting the stamps in said guide, a blade reciprocable through said guide, and means controlled by the operation of said upper roll adapted for moving said lower roll and blade in timed relation, so that a strip of stamps is fed to a position to be severed.

In testimony whereof I affix my signature in presence of two witnesses.

JOSEPH J. SCHERMACK.

Witnesses:
ANNA M. DORR,
CHAS. W. STAUFFEGER.